US008737589B2

(12) United States Patent
Li

(10) Patent No.: US 8,737,589 B2
(45) Date of Patent: May 27, 2014

(54) METHOD AND PHONE TERMINAL FOR DIVERTING CALL

(75) Inventor: Zhongqing Li, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 1239 days.

(21) Appl. No.: 12/290,337

(22) Filed: Oct. 29, 2008

(65) Prior Publication Data

US 2009/0067606 A1    Mar. 12, 2009

Related U.S. Application Data

(63) Continuation of application No. PCT/CN2007/001379, filed on Nov. 22, 2007.

(30) Foreign Application Priority Data

Apr. 30, 2006  (CN) .......................... 2006 1 0079643

(51) Int. Cl.
H04M 3/42       (2006.01)
H04M 1/56       (2006.01)
H04M 15/06      (2006.01)

(52) U.S. Cl.
USPC ............ 379/211.01; 379/211.02; 379/212.01; 379/142.01; 379/142.04; 455/417

(58) Field of Classification Search
USPC ............. 379/211.01, 211.02, 201.01, 212.01, 379/207.15, 142.01, 142.04, 142.1, 142.11; 455/417
See application file for complete search history.

(56) References Cited

U.S. PATENT DOCUMENTS

| 7,145,999 | B2* | 12/2006 | Hayashi et al. | 379/211.02 |
| 7,343,154 | B2* | 3/2008 | Vassilovski | 455/417 |
| 2002/0061099 | A1* | 5/2002 | Hayashi et al. | 379/211.02 |
| 2002/0077090 | A1* | 6/2002 | Vassilovski | 455/417 |
| 2002/0077092 | A1* | 6/2002 | Ow | 455/417 |
| 2005/0002511 | A1* | 1/2005 | Jeler | 379/211.01 |
| 2007/0263814 | A1* | 11/2007 | Jain et al. | 379/201.01 |

FOREIGN PATENT DOCUMENTS

| CN | 1153590 A | 7/1997 |
| CN | 1169233 A | 12/1997 |
| CN | 1301105 | 6/2001 |
| CN | 1420676 A | 5/2003 |
| CN | 2556873 Y | 6/2003 |

(Continued)

Primary Examiner — Thjuan K Addy
(74) Attorney, Agent, or Firm — Kinney & Lange, P.A.

(57) ABSTRACT

The present invention provides two methods for diverting call. The key point is that call diverting information including a number to be called is transmitted when there is an incoming call or a conversation is being conducted and then a party receiving the call diverting information initiates a call to a terminal to which the number to be called directs, so that the call is diverted. Further, the present invention provides two phone terminals. By virtue of the present invention, it is possible for a user to select any terminal to receive a call, and such selection may be made before or during the phone conversation. Moreover, since it is unnecessary to use exiting call diverting methods, it is possible for the function which otherwise should be implemented at the switch side to be easily implemented on a terminal, and thus the cost of call diverting is saved. The present invention is easy to be deployed. According to the present invention, missing of calls will not occur, and it is easy to accomplish timed calling back. Further, the present invention only relates to terminals to which it is applied, and needs no support from operators.

8 Claims, 3 Drawing Sheets

(56) References Cited

FOREIGN PATENT DOCUMENTS

| CN | 1434616 A | 8/2003 |
| CN | 2580704 Y | 10/2003 |
| CN | 1553687 A | 12/2004 |
| CN | 1705335 | 12/2005 |
| EP | 0740483 | 4/1996 |
| EP | 1783694 | 5/2007 |
| JP | 2001-103169 | 4/2001 |

* cited by examiner

METHOD AND PHONE TERMINAL FOR DIVERTING CALL

BACKGROUND OF THE INVENTION

1. Field of Invention

The present invention relates to the field of communication technologies, and more specifically, to a method and a phone terminal for diverting call.

2. Description of Prior Art

At present, communication tools have taken their way into everything of daily life. A user may have several communication terminals. Various terminals may have different communication qualities and communication costs due to their different operators, different operating modes, or different techniques. In terms of cost, the terminals may be categorized into ones of free cost, ones of charged-on-one-side cost, and ones of charged-on-both-side cost. Alternatively, in terms of communication quality, the terminals may be categorized into ones of good qualities, ones of noises, ones of large delays, and ones of intermittences. Or alternatively, in terms of convenience, the terminals may be categorized into fixed ones such as fixed-line phones, ones with small mobility such as cordless phones, and ones with large mobility such as GSM handsets. Taking all those factors into account, there are many choices when a user is selecting a communication-terminal.

Conventionally, call is diverted by the following methods.

The Chinese patent application CN 02226466.3 entitled "Automatic Call Forwarder for Phone" and the Chinese patent application CN 022248610.0 entitled "Apparatus for Diverting Calls for Handset" have disclosed the following technique. A handset number is registered in advance and thus is bonded to a fixed phone number. A seat for a handset is provided beside a fixed phone. When there is a handset inserted into the seat, the fixed phone is automatically triggered to send a signal indicating "handset being seated" to a switch. Then, all incoming calls directed to the handset number from fixed phones are intercepted in the fixed phone network, and are forwarded to a fixed phone associated with this handset. Such technique is termed as "traveler home". Though this technique can divert call, there must be a particular phone in a particular place, and thus its application is strictly limited.

According to the prior call diverting techniques, a phone number to receive calls is set in advance, and calls to a handset are forwarded to the previously set phone. However, usually the following problem is encountered: after a user sets the call diverting for the first time, he/she often forgets to cancel the setting of call diverting, and thus misses many calls. For example, if it is set that calls directed to a handset are forwarded to an office phone but such diverting setting is not canceled after the off-duty time, then all calls to the handset will be forwarded to the office phone after the off-duty time. However, in the office there is no one who will answer these calls during the off-duty period. Thus, there may be some important calls which cannot reach a person who carries the handset. There is also another situation where forwarded calls may be missed. After the call diverting is set, a phone with a number to which calls are to be forwarded is down due to various factors, and thus calls are missed. For example, calls are intended to be forwarded to another mobile terminal C. However, if the mobile terminal C is out of power or is turned off, then all calls may be missed. According to the Chinese patent application CN 200310124456.0 entitled "Method Enabling Mobile Phone to Select Phone Number to Which Incoming Calls Are to Be Forwarded", appropriate technical changes are made to existing diverting methods in telecommunication networks, such as Diverting-No-Answer or Diverting-Busy, without increasing hardware costs. When there is an incoming call, in a manner of call waiting, an instant call diverting operation is carried out on a handset in a gap. However, it involves the call diverting, and thus users will be charged for the cost of the call diverting. This is because resources of mobile operators are assumed. Further, such solution cannot provide call diverting during a conversation.

The Chinese patent application CN 95196683.9 entitled "System and Method Capable of Selectively Receiving Calls without Establishing Voice Communication" has proposed a cellular wireless communication system and a method, comprising reply delay means for receiving calls from a source phone without establishing voice communication between a cell phone and the source phone. As a result, if a user is dealing with another important matter and thus is not able to answer a call, then he/she can answer the call as soon as possible after he/she has handled that matter. However, in this method, the delay mechanism is only established at the receiving party, and the calling party has not been taken into account. If the calling party wants to contact the receiving party, he/she should wait on line. Therefore, though this method has been proposed for a long time, it has not been applied yet. Further, this invention must be applied to cell phones, and thus its application is limited.

The Chinese patent application CN 95194243.3 entitled "Cell Phones and Method for Opening Voice Channel between It and Source Phone without Establishing Voice Communication" has proposed steps similar to those in the application CN 95196683.9, comprising shutting off operations of a microphone and a speaker when a communication channel is established, and notifying information about another terminal by means of this communication channel. However, it has not disclosed how to enable the end initiating the call to automatically initiate the call.

As can be seen, it is desired to solve the problem about how to enable a user to conveniently select a receiving terminal before or during a conversation without involving the call diverting methods provided by operators, which are implemented in switches and must be set in advance.

SUMMARY OF THE INVENTION

In view of this, an object of the present invention is to provide two methods for diverting call. Another object of the present invention is to provide two phone terminals so that a user can select any terminal to receive calls and such selection may be made before or during a conversation.

To achieve the above objects, the present invention provides the following technical solutions.

There is provided a method for diverting call, wherein a communication is taken place between a first terminal and a second terminal, comprising steps of:

a) after receiving a call diverting trigger signal from a user, the first terminal obtaining a number to be called, and sending call diverting information including the number to be called to the second terminal; and b) the second terminal extracting the number to be called from the received call diverting information, interrupting a currently established call, and initiating a new call to a terminal to which the number to be called directs, so that the call is diverted.

Preferably, in step a), the first terminal obtains the number to be called by collecting a calling number inputted by the user at the present end in field, or by collecting a previously set calling number selected by the user at the present end.

Preferably, in step a), the first terminal, after receiving the call diverting trigger signal from the user, further turns off a ringtone and then carries out the subsequent steps.

Preferably, in step a), the call diverting information is sent to the second terminal by means of a short message or a voice channel.

Preferably, the second terminal, after receiving the call diverting information and before carrying out step b), further determines whether the call diverting information comes from the first terminal or not, and if it is a positive result, then carries out step b), or otherwise keeps the current state unchanged.

Preferably, in step b), the second terminal, before initiating the new call to the terminal to which the number to be called directs, further notifies a user at the present end that the current call has been forwarded to another number in forms of voice and/or text, and waits for a confirmation from the user at the present end, wherein, if the second terminal receives the confirmation, it will initiate the new call; or otherwise, it will enter an idle state.

Preferably, in step a), the call diverting information further comprises time information; and in step b), the second terminal, when extracting the number to be called, further extracts the time information, and when a time indicated by the time information comes, it initiates the new call to the terminal to which the number to be called directs, so that the call is diverted.

Preferably, the time information is an absolute time or a relative time.

Preferably, the first and second terminals are mobile terminals or smart fixed phone terminals.

Preferably, if the call has been established while a conversation has not been started, the first terminal is the call receiving terminal and the second terminal is the call initiating terminal; and if the call has been established while the conversation is being conducted, the first terminal is any one of the call initiating terminal and the call receiving terminal and the second terminal is other one of the call initiating terminal and the call receiving terminal.

There is provided a method for diverting call, wherein a communication is taken place between a first terminal and a second terminal, comprising steps of:

A) after receiving a call diverting trigger signal from a user, the first terminal interrupting a currently established call, obtaining a number to be called, and sending call diverting information including the number to be called to the second terminal; and B) the second terminal extracting the number to be called from the received call diverting information, and initiating a new call to a terminal to which the number to be called directs, so that the call is diverted.

Preferably, in step A), the call diverting information is sent to the second terminal by means of a short message or a voice channel.

Preferably, the second terminal, after receiving the call diverting information and before carrying out step B), further determines whether the call diverting information comes from the first terminal or not, and if it is a positive result, then carries out step B), or otherwise keeps the current state unchanged.

Preferably, in step B), the second terminal, before initiating the new call to the terminal to which the number to be called directs, further notifies a user at the present end that the current call has been forwarded to another number in forms of voice and/or text, and waits for a confirmation from the user at the present end, wherein, if the second terminal receives the confirmation, it will initiate the new call; or otherwise, it will enter an idle state.

Preferably, in step A), the call diverting information further comprises time information; and in step B), the second terminal, when extracting the number to be called, further extracts the time information, and when a time indicated by the time information comes, it initiates the new call to the terminal to which the number to be called directs, so that the call is diverted.

Preferably, the first and second terminals are mobile terminals or smart fixed phone terminals.

Preferably, if the call has been established while a conversation has not been started, the first terminal is the call receiving terminal and the second terminal is the call initiating terminal; and if the call has been established while the conversation is being conducted, the first terminal is any one of the call initiating terminal and the call receiving terminal and the second terminal is other one of the call initiating terminal and the call receiving terminal.

There is provided a phone terminal, comprising a CPU, a communication module for exchanging information with outside, a storage module and an input device, wherein, the CPU receives a call diverting trigger signal from the input device, obtains a number to be called and constructs call diverting information including the number to be called, and then sends the call diverting information to the communication module, which in turn sends the call diverting information out; or the CPU receives call diverting information from outside through the communication module, extracts a number to be called from the received call diverting information, and controls the communication module to interrupt a currently established call, and then controls the communication module to initiate a new call to a terminal to which the number to be called directs.

Preferably, after receiving the call diverting trigger signal from the input device, the CPU controls a voice drive module of the phone terminal to turn off a ringtone.

Preferably, the CPU obtains the number to be called by collecting information inputted by the input device, or by getting it from the storage module of the phone terminal based on the information inputted by the input device.

Preferably, the phone terminal further comprises a display device for displaying information inputted by the input device under the control of the CPU, or for displaying information on incoming calls.

Preferably, the input device is a keypad having a call diverting key added, or a keypad having a function of call diverting added to an existing key.

Preferably, the communication module is a wireless or wired communication module.

Preferably, the wired communication module comprises, but not limited to, a PSTN communication module or an Ethernet communication module.

Preferably, the phone terminal is a mobile terminal or a smart fixed phone terminal.

There is provided a phone terminal, comprising a CPU, a communication module for exchanging information with outside, a storage module and an input device, wherein, the CPU receives a call diverting trigger signal from the input device, controls the communication module to interrupt a currently established call, obtains a number to be called and constructs call diverting information including the number to be called, and then sends the call diverting information to the communication module, which in turn sends the call diverting information out; or the CPU receives call diverting information from outside through the communication module, extracts a number to be called from the received call diverting information, and then controls the communication module to initiate a new call to a terminal to which the number to be called directs.

Preferably, the CPU obtains the number to be called by collecting information inputted by the input device, or by getting it from the storage module of the phone terminal based on the information inputted by the input device.

Preferably, the phone terminal further comprises a display device for displaying information inputted by the input device under the control of the CPU, or for displaying information on incoming calls.

Preferably, the input device is a keypad having a call diverting key added, or a keypad having a function of call diverting added to an existing key.

Preferably, the communication module is a wireless or wired communication module.

Preferably, the phone terminal is a mobile terminal or a smart fixed phone terminal.

The key point of the present invention is that call diverting information including a number to be called is transmitted when there is an incoming call or a conversation is being conducted and then a party receiving the call diverting information initiates a call to a terminal to which the number to be called directs, so that the call is diverted. If call diverting is carried out according to the present invention, it is possible for a user to select any terminal to receive a call, and such selection may be made before or during the phone conversation. As a result, the usual problem of the prior art that one forgets to set or cancel the call diverting is solved. Further, the user may select a terminal to receive calls by inputting the number of this terminal or by using a previously stored number. Since it is unnecessary to use exiting call diverting methods provided by operators, which are implemented in switches and must be set in advance, it is possible for the function which otherwise should be implemented at the switch side to be easily implemented on a terminal, and thus the cost of call diverting is saved.

The present invention is easy to be deployed. According to the present invention, missing of calls will not occur, and it is easy to accomplish timed calling back.

Further, the present invention only relates to terminals to which it is applied, and needs no support from operators.

DETAILED DESCRIPTION OF PREFERRED EMBODIMENTS

Hereinafter, the present invention is further illustrated in detail with reference to attached drawings and embodiments thereof.

Figure 1:
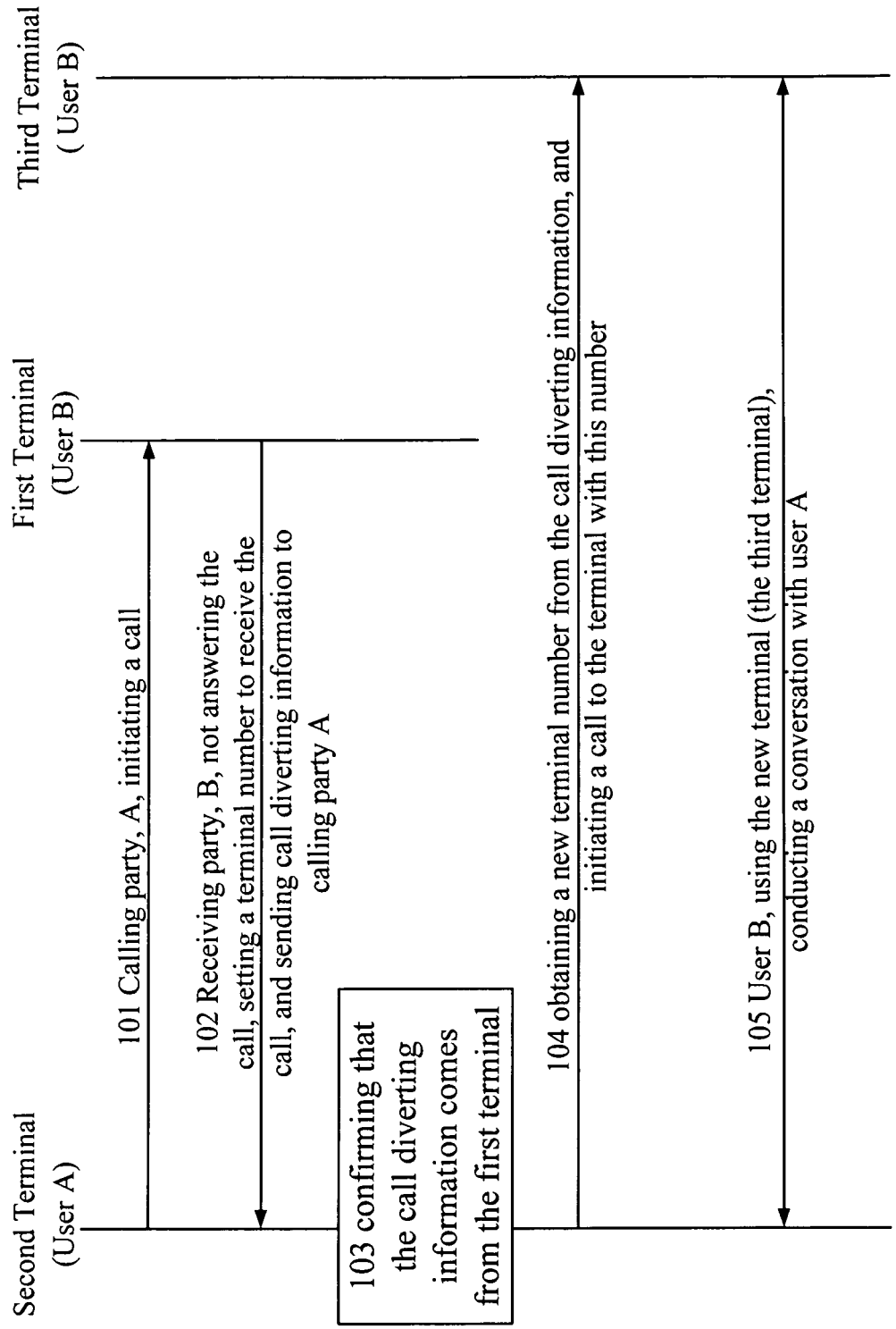
FIG. 1 is a schematic view showing a flow of call diverting according to an embodiment of the present invention.

FIG. 1 is a schematic view showing a flow of call diverting according to an embodiment of the present invention. In this example, a second terminal at which user A locates, as a calling party, initiates a call to a first terminal at which user B locates. After the call is established, user B, as a receiving party, does not answer this call, but hopes to use a third terminal to answer this call. This is implemented in the following steps.

Step 101: User A initiates a call to the first terminal by using the second terminal.

Figure 2:
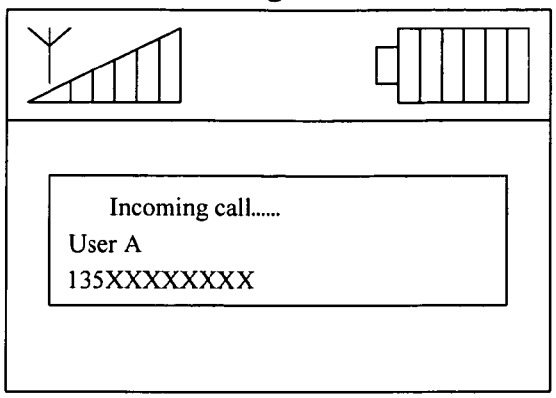
FIG. 2 is a schematic view showing an answering interface of a handset having a diverting key added.

Step 102: As a receiving party, user B does not answer the call when he/she sees the information that the first terminal has received an incoming call, but sends a call diverting trigger signal to the first terminal by means of a keypad. An interface at this time is shown in FIG. 2. After receiving the call diverting trigger signal, the first terminal turns off a ringtone, obtains a number to be called, and sends call diverting information including the number to be called to the second terminal.

The above step of turning off the ringtone is optional, which is for the user's convenience. Of course, this step can be omitted. Thus, it suffices that the first terminal remains the current state. Further, after receiving the call diverting trigger signal, the first terminal may immediately hang up the call from the second terminal, that is, interrupt the currently established call. Anyway, the application is flexible.

Figure 3:
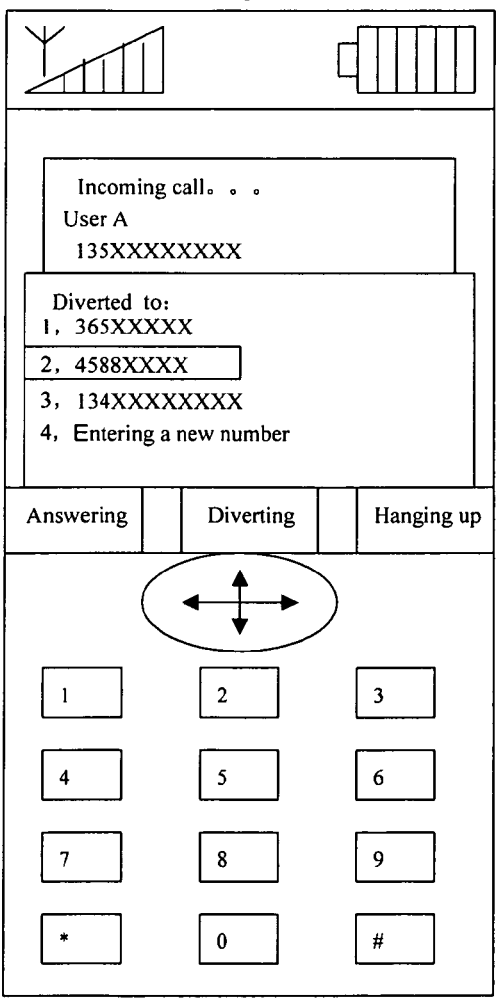
FIG. 3 is a schematic view showing a call diverting interface of a handset having a diverting key added in a call incoming state.

The first terminal may obtain the number to be called in various manners. For example, the number to be called may be obtained by collecting a calling number inputted by the user at the present end in field. That is, the number to be called is directly entered by user B at the first terminal. Or otherwise, the number to be called may be obtained by collecting a previously set calling number selected by the user at the present end. That is, some numbers to which calls are to be forwarded are set by user B in advance. In this case, it is only necessary to select one from the previously set numbers. The interface at this time is shown in FIG. 3.

A key in the keypad for sending the call diverting trigger signal is termed as diverting key. This diverting key may be an added one, as shown in FIG. 3, or may be extended from an existing key. The extended key will involve a more step of key pressing, which is somewhat inconvenient; and the added key can accomplish the object at once and thus improves the convenience, but increases the cost.

The first terminal may send the call diverting information including the number to be called to the second terminal in various manners, for example, by means of a short message or a voice channel, which can be determined as desired. Sending the call diverting information by the short message has advantages of few assumed resources and cheap cost, but has the disadvantage of poor real-time performance when a signaling channel is jammed, which may result in some delay. Sending the call diverting information by the voice channel has the advantage of good real-time performance. It is a prior art to send digital signals by means of a voice channel, referring to the method disclosed by CN95194243.3.

Step 103: When receiving the call diverting information, the second terminal determines whether this call diverting information comes from the first terminal or not. If it is a positive result, step 104 is carried out; otherwise, the current calling state is kept unchanged.

Step 104: The second terminal extracts the number to be called from the call diverting information and interrupts the currently established call, and then initiates a new call to a third terminal to which the number to be called directs. As a result, the call is diverted. If in step 102 the first terminal hangs up the call from the second terminal, that is, interrupts the currently established call, when receiving the call diverting trigger signal, then in this step the operation of interrupting the currently established call is absent. Instead, after extracting the number to be called from the received call diverting information, the second terminal directly initiates the new call to the third terminal to which the number to be called directs, so that the call is diverted. That is to say, if a party initiating the call diverting has interrupted the current call, then there is no more need for another party performing the call diverting to interrupt the currently established call, because this call has already been interrupted.

Further, before the second terminal initiates the new call to the third terminal to which the number to be called directs, the method may further comprise: notifying user A that the current call has been forwarded to another number in forms of voice and/or text. For example, a message, "under the request from the receiving party, the current call has been forwarded to the number of XXXXXXXX, confirm?", may be displayed on a screen. Or otherwise, before initiating the new call, composed voice or recorded voice, "Under the request from the receiving party, the current call has been forwarded to the number of XXXXXXXX. Please press the 'confirm' key to confirm the call; otherwise it will be hung up within 15 seconds.", which is stored in a storage module of the terminal, may be played by a speaker. After receiving the confirmation from user A, the second terminal initiates the new call; otherwise, the second terminal enters an idle state, and will not initiate any call. Thus, the notice to the party initiating the call is accomplished.

Moreover, in the call diverting according to the present invention, a function of timed reply may be accomplished as follows.

Time information is further included in the call diverting information. This time information may be an absolute time such as 8:30, or may be a relative time such as 10 minutes or 20 minutes. Thus, when the second terminal extracts the number to be called from the call diverting information, it further extracts the time information, and initiate a new call to the terminal to which the number to be called directs when the time indicated by the time information comes. As a result, the call is diverted. For example, a short message formatted into "10/45665788" indicates that the second terminal should call the third terminal with the number of 45665788 after 10 minutes. Then, the second terminal starts timing when receiving this short message, and initiates a call to the number 45665788 when the time comes.

The above described first and second terminals may be mobile terminals, or may be smart fixed phone terminals. If it is the latter case, it is necessary for the smart fixed phone terminal to have a CPU and a storage module, preferably, also a display screen for displaying numbers to be selected. Of course, it is possible if there is no such display screen, but some operations will be blind ones, for example, inputting phone numbers, or operating as instructed by voice prompts. For example, it is prompted that the call will be forwarded to the first stored phone number when "1" is pressed, to the second stored phone number when "2" is pressed, and to the phone number entered in field when "3" is pressed.

The above embodiments deal with the case where the call has been established while the conversation has not been started, that is, the first terminal has an incoming call displayed while user B does not answer it. If the call has been established and the conversation has been started, that is, when user A and user B are conducting the conversation by using the second and first terminals respectively, the call may also be diverted by the above method. The difference is that any party of user A and user B, that is, any one of the call initiating party and the call receiving part, can initiate the call diverting. Other aspects are same as those above.

Next, a phone terminal for diverting call according to the present invention is explained.

Figure 4:
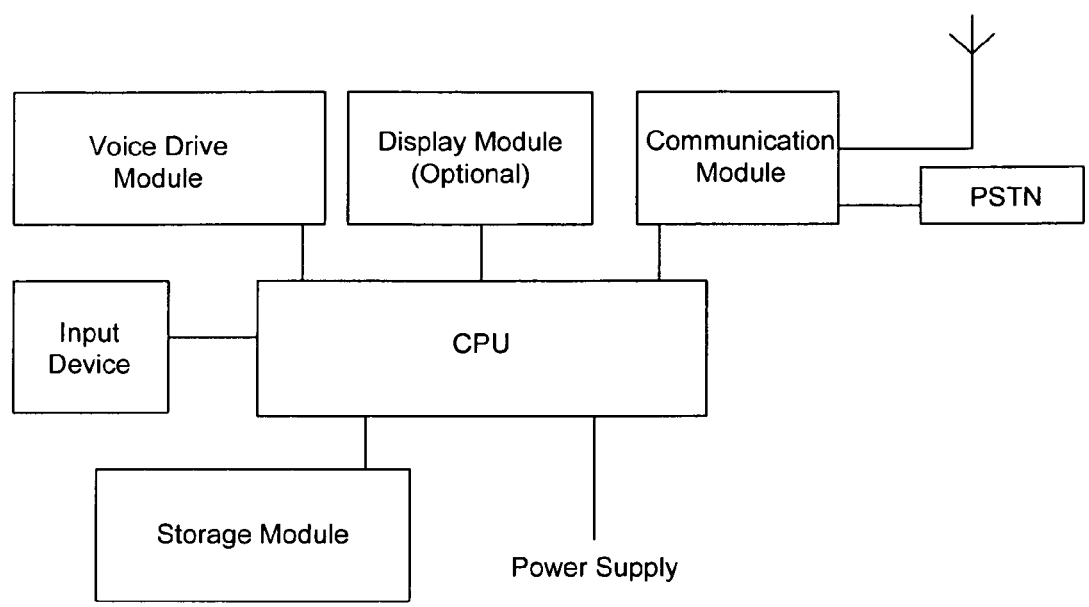
FIG. 4 is a schematic view showing the structure of a phone terminal according to the present invention.

FIG. 4 is a schematic view showing the structure of the phone terminal according to the present invention. The phone terminal comprises a CPU, a communication module for exchanging information with outside, a storage module and an input device.

The CPU is adapted to receive the call diverting trigger information from the input device, obtain the number to be called and construct the call diverting information including the number to be called, and then send the call diverting information to the communication module, which in turn sends the call diverting information out. Or otherwise, the CPU is adapted to receive the call diverting information from outside through the communication module, extract the number to be called from the received call diverting information, control the communication module to interrupt the currently established call, and then control the communication module to initiate a new call to the terminal to which the number to be called directs. The communication module may be a wireless or wired communication module. The wired communication module comprises, but not limited to, a PSTN communication module or an Ethernet communication module. That is to say, the phone terminal may be a mobile terminal or a smart fixed phone terminal.

After receiving the call diverting trigger signal from the input device, the CPU may further control a voice drive module of the phone terminal to turn off the ringtone, or control the communication module to interrupt the currently established call. Certainly, if the CPU of the party who initiates the call diverting has already controlled the communication module thereof to interrupt the currently established call, then the CPU of the party who carries out the call diverting needs not to control the communication module thereof to interrupt the currently established call, which has already been interrupted.

The CPU may obtain the number to be called by collecting information inputted by the input device, or by getting it from the storage module of the phone terminal based on the information inputted by the input device.

If the phone terminal further comprises a display device such as a display screen, the display is adapted to display the information inputted by the input device or information on incoming calls under the control of the CPU.

The input device of the phone terminal may be a keypad having a call diverting key added, or may be a keypad having a function of call diverting added to an existing key.

The power to the CPU may be supplied from an externally connected power source, or from a battery. In the case of PSTN, if the power supply is enough, then no additional power source is necessary.

Those described above are just preferred embodiments of the present invention, and are not intended to limit the scope of the invention. Various modifications, equivalents, or modifications can be made without departing from the spirit and principle of the present invention, and they shall fall into the scope of the present invention.

What is claimed is:

1. A method for diverting a call, wherein the method is applied to a communication system including a first terminal as a receiving party and a second terminal as a calling party, the method comprising:
   a) receiving, by the first terminal, a call diverting trigger signal from a user of the first terminal, obtaining, by the first terminal, a number to be called, and sending, by the first terminal, call diverting information including the number to be called and time information to the second terminal; and b) extracting, by the second terminal, the number to be called and the time information from the call diverting information, interrupting, by the second terminal, a currently established call, and initiating, by the second terminal, a new call to a terminal corresponding to the number to be called based on the time information.

2. The method according to claim 1, wherein the step of obtaining a number to be called comprises collecting a calling number inputted by the user at the first terminal, or collecting a previously set calling number selected by the user at the first terminal.

3. The method according to claim 1, further including, after the step of receiving, by the first terminal, a call diverting trigger signal from a user, turning off a ringtone of the first terminal.

4. The method according to claim 1, further including, before the step of extracting, by the second terminal, the number to be called from the call diverting information: determining, by the second terminal, whether the call diverting information comes from the first terminal, and carrying out step b) while the call diverting information comes from the first terminal.

5. The method according to claim 1, further including, before the step of initiating, by the second terminal, a new call to a terminal corresponding to the number to be called: notifying the user at the second terminal that the current call has been diverted to another number in forms of voice and/or text, and waiting for a confirmation from the user, wherein, if the second terminal receives the confirmation, it will initiate the new call; or otherwise, it will enter an idle state.

6. A phone terminal used as a receiving party, the phone terminal comprising:
a processing unit, a communication module for exchanging information with outside devices, a storage module and an input device, wherein,
the processing unit is configured to receive a call diverting trigger signal from the input device operated by a user of the phone terminal, obtain a number to be called and construct call diverting information including the number to be called, and send the call diverting information to the communication module, and
the input device is a keypad having a call diverting key, or a keypad having a key with a function of call diverting.

7. The phone terminal according to claim 6, further including a voice drive module configured to turn off a ringtone under the control of the processing unit.

8. The phone terminal according to claim 6, wherein, the number to be called is obtained by the processing unit via collecting information inputted by the input device, or retrieval from the storage module.

\* \* \* \* \*